United States Patent [19]
Maurer et al.

[11] Patent Number: 5,727,017
[45] Date of Patent: Mar. 10, 1998

[54] METHOD AND APPARATUS FOR DETERMINING EMISSIVITY OF SEMICONDUCTOR MATERIAL

[75] Inventors: Michael Maurer, Ulm; Wilfried Lerch, Blaustein; Alexander Gschwandtner, München, all of Germany

[73] Assignee: AST Electronik, GmbH, Kirchheim, Germany

[21] Appl. No.: 632,364

[22] Filed: Apr. 10, 1996

[30] Foreign Application Priority Data

Nov. 4, 1995 [DE] Germany ............ 195 13 749.3

[51] Int. Cl.$^6$ ............ G01J 5/10; G01N 25/00
[52] U.S. Cl. ............ 374/9; 374/126
[58] Field of Search ............ 374/9, 120, 121, 374/126, 128, 130, 161; 356/45; 250/339.01

[56] References Cited

U.S. PATENT DOCUMENTS

| | | | |
|---|---|---|---|
| 4,465,382 | 8/1984 | Iuchi et al. | 374/126 |
| 4,919,542 | 4/1990 | Nulman et al. | 374/9 |
| 4,989,991 | 2/1991 | Pecot et al. | 374/133 |
| 5,114,242 | 5/1992 | Gat et al. | 374/126 |
| 5,226,732 | 7/1993 | Nakos et al. | 374/126 |
| 5,271,084 | 12/1993 | Vandenabeele et al. | 374/126 |
| 5,501,637 | 3/1996 | Duncan et al. | 374/9 |

FOREIGN PATENT DOCUMENTS

| | | | |
|---|---|---|---|
| 0618430 A1 | 10/1994 | Germany. | |
| 55-144513 | 11/1980 | Japan | 374/9 |
| 57-30916 | 2/1982 | Japan | 374/9 |

OTHER PUBLICATIONS

Burton Bernard, "Determining Emissivity", Instruments and condtrol Systems 37, 87, (1964).

*Primary Examiner*—G. Bradley Bennett
*Attorney, Agent, or Firm*—Rodney T. Hodgson

[57] ABSTRACT

A method and apparatus for measuring the emission coefficient of a semiconductor material for light of wavelength λ having photon energy less than the semiconductor bandgap energy is introduced. The reflection coefficient for the light of wavelength λ is measured while the semiconductor material is being irradiated with sufficient light having photon energy greater than the bandgap energy that the semiconductor material transmits little light of wavelength λ, and the emission coefficient is calculated from the measured reflection coefficient. The temperature of the semiconductor material can be calculated from the emission coefficient and the measured intensity of the thermally emitted radiation of wavelength λ.

6 Claims, 2 Drawing Sheets

5,727,017

1

METHOD AND APPARATUS FOR DETERMINING EMISSIVITY OF SEMICONDUCTOR MATERIAL

BACKGROUND OF THE INVENTION

1. Field of the Invention

The present invention relates to a method and an apparatus determining the emissivity of a non-opaque semiconductor material. This is especially important for the determination of the temperature of the semiconductor material by optical pyrometry, which is vital for the rapid thermal processing (RTP) of sensitive electronic materials.

2. Description of the Prior Art

Rapid Thermal Processing (RTP) is a versatile optical heating method which can be used for semiconductor processing as well as a general, well controlled, method for heating objects or wafers which are in the form of thin sheets, slabs, or disks. The objects are generally inserted into a chamber which has at least some portions of the chamber walls transparent to transmit radiation from powerful heating lamps. The transparent portion of the walls is generally quartz, which will transmit radiation up to a wavelength of about 4 microns. These lamps are generally tungsten-halogen lamps, but arc lamps or any other source of visible and/or near infra-red radiation may be used. The radiation from the lamps is directed through the transparent portions of the walls on to the surface of the object to be heated. As long as the objects absorb light in the near infrared or visible spectral region transmitted by the transparent portion of the walls, RTP techniques allow fast changes in the temperature and process gas for the different material processes and conditions. RTP allows the "thermal budgets" of the various semiconductor processing to be reduced, as well as allows the production of various metastable states which can be "frozen in" when the material is cooled rapidly.

RTP systems are relatively new. In the last 10 or 15 years, such systems were used only in research and development. The thrust of the work was increasing the temperature uniformity, and developing heating cycles and processes which decreased the thermal budget. Prior art RTP machines can heat unstructured, homogeneous materials in the form of a flat plate or disk, and produce temperature uniformities across the plate adequate for semiconductor processing processes.

The temperature control in current RTP systems is mostly performed by monochromatic (or narrow wavelength band) infrared pyrometry measuring temperature of the relatively unstructured and featureless backside of semiconductor wafers. The results of the temperature measurement are generally used in a feedback control to control the heating lamp power. However, the measurement of the temperature requires a knowledge of the emissivity of the material in the semiconductor wafer. At wafer temperatures above 600 C., the emissivity is constant and well known. However, at temperatures below 600 C., the emissivity is not well known and varies with temperature.

A method of temperature control is the power controlled open loop heating described in U.S. Pat. No. 5,359,693 which patent is hereby incorporated by reference.

German patent DE42 23 133 C2, hereby incorporated by reference, discloses a method of producing relatively defect free material in RTP machines.

U.S. Pat. No. 5,308,161 by Alexander Stein, issued May 3, 1994, hereby incorporated by reference, teaches a method of measuring reflectivity and hence emissivity of opaque semiconductor wafers.

2

U.S. Pat. No. 5,282,017 by Kasindorf et al. issued Jan. 25, 1994, hereby incorporated by reference, teaches a method of measuring hemispherical reflectance and hence emissivity of opaque semiconductor wafers.

Most RTP machines have a thin rectangular quartz reaction chamber having one end open. Chambers meant for vacuum use often have a flattened oval cross section. Chambers could even be made in the form of a flat cylindrical pancake. In general, the chambers are used so that the thin objects to be heated are held horizontally, but they could also be held vertical or in any convenient orientation. The reactor chamber is usually thin to bring the lamps close to the object to be heated. The reactor chamber is opened and closed at one end with a pneumatically operated door when the wafer handling system is in operation. The door is usually made of stainless steel, and may have a quartz plate attached to the inside. The process gas is introduced into the chamber on the side opposite the door and exhausted on the door side. The process gas flow is controlled by computer controlled valves connected to various manifolds in a manner well known in the art.

3. Related Patent Applications

Copending patent application Ser. No. 08/387,220, now U.S. Pat. No. 5,580,530, assigned to the assignee of the present invention, hereby incorporated by reference, teaches the importance of the gas flow and the use of an aperture in the door to regulate gas flow and control impurities in the process chamber.

The wafer to be heated in a conventional RTP system typically rests on a plurality of quartz pins which hold the wafer accurately parallel to the reflector walls of the system. Prior art systems have rested the wafer on an instrumented susceptor, typically a uniform silicon wafer. Copending patent application Ser. No. 08/537,409, assigned to the assignee of the present invention, hereby incorporated by reference, teaches the importance of succeptor plates separated from the wafer.

OBJECTS OF THE INVENTION

It is an object of the invention to provide an improved rapid thermal processing (RTP) apparatus, method and system.

It is an object of the invention to provide an apparatus and a method of determining the radiation reflectivity of a surface of a semiconductor material when the semiconductor material is partially transparent to the radiation.

It is an object of the invention to provide an apparatus and a method for determining a property of a partially transparent semiconductor material by measuring the reflectivity of a surface of the semiconductor material.

It is an object of the invention to determine the emissivity of a partially transparent semiconductor material by measuring the reflectivity of a surface of the semiconductor material.

It is an object of the invention to determine the emissivity and the temperature of a partially transparent semiconductor material by measuring the reflectivity of a surface of the semiconductor material and the radiation emitted from the surface of the semiconductor surface.

SUMMARY OF THE INVENTION

A semiconductor material is irradiated with radiation having a first photon energy greater than the bandgap of the semiconductor material. The radiation produces sufficient electrons in the material that the transmittance of the mate-

3 rial to radiation having a second photon energy less than the bandgap of the material is greatly decreased. The reflectivity of the semiconductor material at the second photon energy can then be measured more accurately, and properties such as the emissivity of the semiconductor material at the second photon energy can be determined. If the emissivity is known, the temperature can be measured by measuring the electromagnetic radiation intensity emitted from the semiconductor material

DETAILED DESCRIPTION OF THE INVENTION

Figure 1:
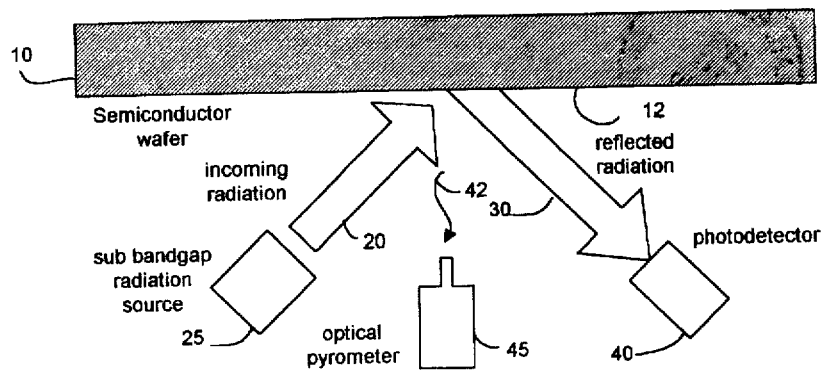
FIG. 1 shows a sketch of a method of measuring the radiation reflection coefficient of a semiconductor material.

FIG. 1 shows a sketch of a method of measuring the electromagnetic (EM) radiation reflection coefficient for sub bandgap radiation of a semiconductor material. (Sub bandgap radiation is EM radiation having photon energy less than the bandgap energy of the semiconductor) A semiconductor wafer 10 has a beam of radiation 20 emitted from a sub bandgap radiation source 25 impinging on a surface 12 of the wafer. The radiation beam 20 is partially transmitted through the surface 12, and partially reflected as radiation beam 30 into a photodetector 40. For simplicity, the wafer 10 is shown here as highly polished and the beam 30 is specularly reflected from the surface 12 of the wafer 10. If the wafer is not specularly reflecting, methods as taught in U.S. Pat. No. 5,282,017 may be used to good effect, but the setup used in FIG. 1 can be also used to measure reflectivity if a correction factor is used. The intensity of radiation beam 30 is measured, and compared to the intensity of the previously or simultaneously measured radiation beam 20. The ratio of intensities gives the reflection coefficient ρ of the surface 12 for the wavelength or energy of the radiation of the radiation beam 20. If the reflectivity is known, other properties of the semiconductor material may be calculated. The reflectivity may depend on the polarization of the beam 20 and angle of incidence of the beam 20 on to the surface 12. For example, if the wafer 10 absorbs the part of the radiation beam 20 transmitted through the surface 12, the emissivity ε of the surface 12 is just the additive inverse of the reflectivity or reflection coefficient ρ. (ie. ρ+ε=1). The optical pyrometer 45 measures the radiation intensity of radiation 42 thermally emitted from the surface 12, and the temperature of the wafer 10 can be computed using the emissivity ε of the surface 12 by methods very well known in the art of optical pyrometry.

The measurement of the temperature of the wafer 10 by optical pyrometry depends on an accurate knowledge of the emissivity ε for radiation having photon energy below the bandgap of the semiconductor material of the semiconductor wafer 10. For low temperatures (below 650 C.) most of the thermally emitted radiation is radiated with energies substantially below the band gap energy of the semiconductor

4 material. The pyrometer gives the best measurements when infrared wavelengths are used. A preferred wavelength range is the range 1–4 microns. A more preferred range is the range 2–3 microns. The most preferred range is the range 2.7 to 2.8 microns. At 2.73 microns, the emissivity ε varies between 0.1 and 0.65 for silicon as the temperature is raised from room temperature to 650 C. Above 650 C., the silicon is substantially opaque and the emissivity is substantially constant at 0.65.

Figure 2:
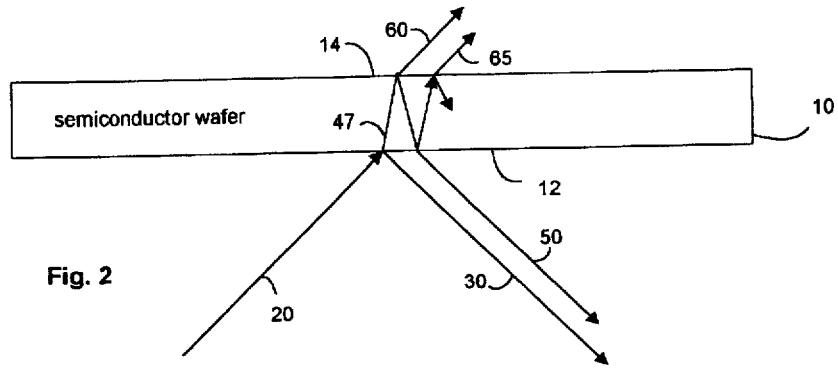
FIG. 2 shows a sketch of ray tracing of the radiation when the semiconductor material of FIG. 1 is partially transmitting.

Lightly doped semiconductor materials transmit radiation with energy below the bandgap until the temperature is quite high. Thus, the measurement of reflection coefficient and emissivity for such a case has to deal with the situation sketched in FIG. 2. Here, the beam of radiation 20 impinging on the surface 12 is partially reflected as beam 30, and partially transmitted as beam 47 to the opposite surface 14 of the wafer 10. Beam 47 is partially transmitted from the surface 14 as radiation beam 60, and partially reflected from surface 14 to impinge again on surface 12. A part of this beam emerges from the surface as beam 50, where it may travel parallel with the originally reflected beam 30 and cause a false measurement of the reflection coefficient when it is measured by photodetector 40. Multiple reflections and transmissions such as beam 65 as shown in the diagram cause further complications.

Figure 3:
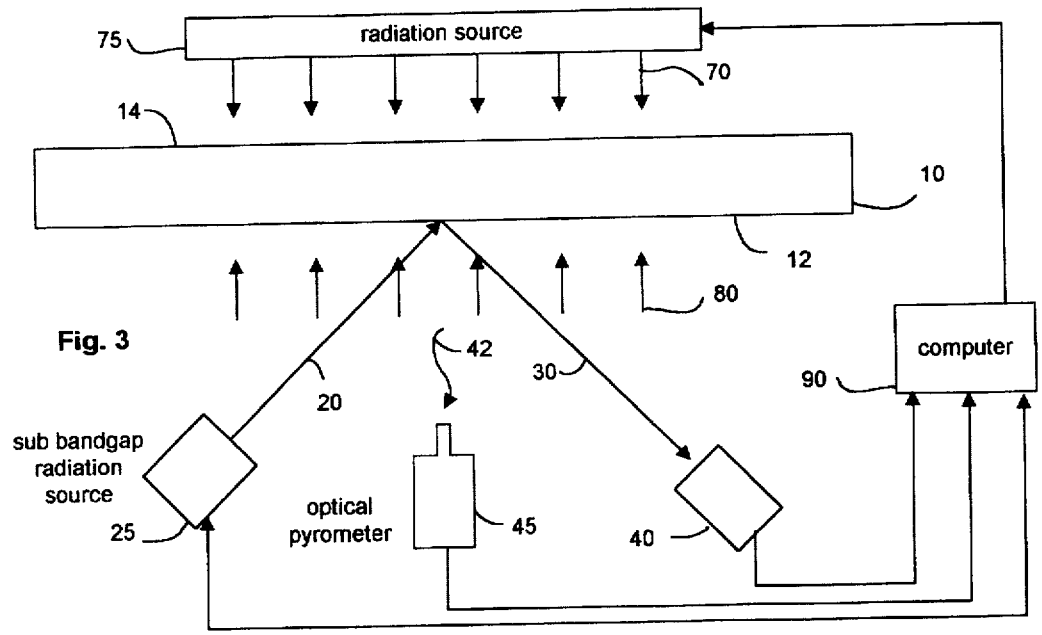
FIG. 3 shows a sketch of a preferred apparatus for using the method of the invention.

The apparatus for producing the method of the invention is shown in FIG. 3. Electro magnetic (EM) radiation 70 having photon energy higher than the band gap energy of the semiconductor material of the wafer 10 is produced by a radiation source 75. The radiation 70 impinges on the wafer 10 and causes electron hole pairs to be generated in the semiconductor material of wafer 10. The electrons stop the radiation beam 47 from being transmitted through the wafer 10, and hence only the radiation beam 30 which has had a single reflection from the surface 12 is received at the photodetector 40. For the temperatures from room temperature to about 650 C. for silicon and 1000 C. for GaAs, enough electrons to stop radiation beam 47 from being transmitted through wafer 10 only arise when the electron density is greater than the thermal equilibrium electron density. If radiation 70 produces such a non equilibrium electron density, the electrons recombine with holes or move to surfaces or defects where they recombine. Typical times for the electron recombination range from milliseconds to microseconds for silicon wafers. During this time, the reflection coefficient may be measured.

Radiation source 75 is shown only on one side of the wafer 10. Radiation 80 having photon energy greater than the bandgap energy of the semiconductor material of wafer 10 may also be optionally radiated from the other side of the wafer 10. The radiation source for radiation 80 is not shown here for clarity. The radiation source for producing radiation 70 and/or 80 with photon energy greater than the band gap energy of the semiconductor material of wafer 10 may be one or more arc lamps, lasers, flash lamps, tungsten halogen lamps, or any other combination of such well known sources. The radiation 70 and 80 may be continuously operating, or may be pulsed. The radiation 70 and 80 may be used together, or radiation 70 alone may be used, or radiation 80 alone may be used to produce the electrons which make the wafer 10 opaque to the sub bandgap EM radiation from source 25.

The sub bandgap photon energy radiation source 25 may likewise be continuously operating or pulsed. It is well known in the art to measure reflection coefficients in a very short time. The sub bandgap radiation source 25 may be a laser, an arc lamp, a spectral lamp, or a tungsten lamp with appropriate filters to provide the wavelength of the sub bandgap radiation required for the reflectivity measurement. Radiation source 25 may also comprise lenses, mirrors, optical fibers, and other optical elements and means for conducting light from the lamp to the surface 12 of the wafer 10. Such elements and means are well known in the art. Likewise, photodetector 40 and pyrometer 45 may further comprise lenses, mirrors, optical fibers, and other optical means for conducting light from the surface 12 to the photodetector 40 and/or the pyrometer 45.

Optional computer 90 may be optionally be attached to pyrometer 45 and/or sub bandgap radiation source 25 and/or to the photodetector 40 and/or radiation source 75 for control and measurement purposes.

Figure 4:
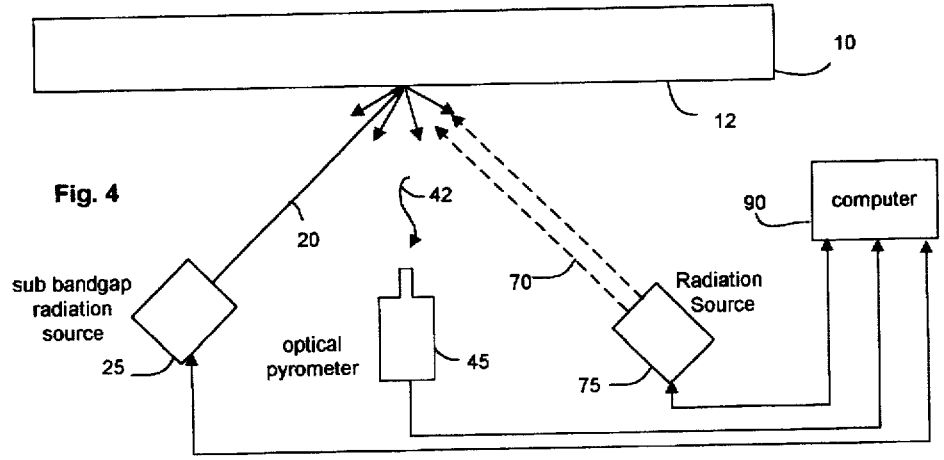
FIG. 4 shows a sketch of an alternative preferred apparatus for using the method of the invention.

Although a separate photodetector 40 and pyrometer 45 are shown in FIG. 3 in the case of a specularly reflecting semiconductor material surface 12, a single photodetector is used in an alternative preferred embodiment sketched in FIG. 4 for the case where the sub bandgap radiation from source 25 impinges on a scattering surface 12. The scattered light from source 25 would then reach the pyrometer 45, and the pyrometer 45 could be used to measure the intensity of the scattered light from source 25 in order to measure the reflectivity and the emissivity of the semiconductor wafer 10. The pyrometer 45 can measure the thermally emitted radiation from wafer 10 in addition, and the temperature of the semiconductor wafer 10 may be calculated from the measured values.

Also shown in FIG. 4 is an arrangement where the radiation source 75 illuminates a small region of the semiconductor surface 12. The electrons produced by radiation from source 75 are located in the field of view of pyrometer 45. This arrangement is particularly suited to a source 75 which is a laser. However, means well known in the art may also be used to transport photons from source 75 to the surface 12 when source 75 is an arc lamp, light emitting diode, or flash lamp.

Figure 5:
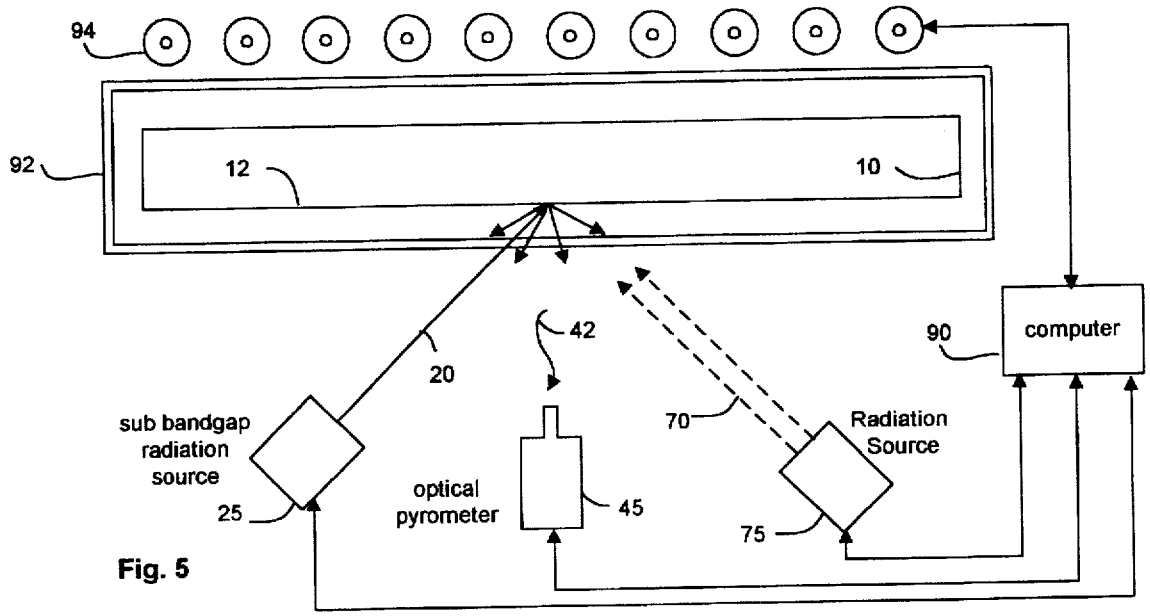
FIG. 5 shows a sketch of an alternative preferred apparatus for using the method of the invention.

FIG. 5 shows a preferred embodiment where the reflectivity of the wafer 10 is measured when the wafer 10 is contained in a thermal processing system. In the particular case shown in FIG. 5, the thermal processing system is a rapid thermal processing (RTP) system using an enclosure 92 to surround wafer 10. A bank of lamps 94 heats wafer 10 using radiation transported through the transparent walls of the RTP system enclosure. The sub bandgap radiation beam 20 is shown passing through the transparent walls of the RTP enclosure 92, as well as the beam 70 from radiation source 75 and the radiation from beam 20 scattered to the pyrometer 45 and the radiation 42 thermally emitted from the surface 12 of wafer 10 which passes through the enclosure 92 to reach the optical pyrometer 45.

The most preferred apparatus for producing the method of the invention uses a pulsed laser as source 75. A Nd-YAG laser producing pulses of light at 1.06 micron wavelength is preferred. Even more preferred is an Alexandrite laser producing light at about 0.7 micron. Yet more preferred is an Excimer laser which can produce light at 0.308 micron wavelength, or a number of other wavelengths which have photon energy above the bandgap of most semiconductors.

To produce sufficient electrons to make wafer 10 opaque to sub bandgap radiation, the source 75 must deposit more than 100 watts/cm$^2$ energy into the semiconductor 10. More preferred is more than 1000 watts/cm$^2$. Most preferred is more than 10,000 watts/cm$^2$.

The most preferred method of the invention is a method of measuring the temperature of a semiconductor material which comprises the following steps:

a) directing electromagnetic (EM) radiation having photon energy less than the bandgap energy of the semiconductor material on to a first surface of the semiconductor material;

b) directing sufficient EM radiation having photon energy greater than the bandgap energy of the semiconductor material on to a second surface of the semiconductor material to greatly reduce the transmission of the radiation having photon energy less than the bandgap energy through the semiconductor material;

c) measuring the reflection coefficient ρ of the first surface for the radiation having photon energy less than the bandgap energy of the semiconductor material;

d) calculating the emissivity the semiconductor material from the measured reflection coefficient ρ;

e) measuring the radiation intensity thermally emitted from the first surface for radiation having photon energy less than the bandgap energy; and f) calculating the temperature of the semiconductor material using the thermally emitted radiation intensity and the calculated emissivity.

Given this disclosure, alternative equivalent embodiments that are within the contemplation of the inventors would become apparent to one skilled in the arts.

We claim:

1. A method of measuring a property of a semiconductor material in a semiconductor material thermal processing system, comprising:

a) directing electromagnetic (EM) radiation having photon energy less than the bandgap energy of the semiconductor material on to a first surface of the semiconductor material;

b) directing EM radiation having photon energy greater than the bandgap energy of the semiconductor material on to a second surface of the semiconductor material, the EM radiation having photon energy greater than the bandgap energy of the semiconductor material having sufficient intensity to produce enough electrons to substantially reduce the transmission in the semiconductor material of the EM radiation having photon energy less than the bandgap energy;

c) measuring the reflection coefficient ρ of the first surface for the radiation having photon energy less than the bandgap energy of the semiconductor material; and d) calculating the property of the semiconductor material from the measured reflection coefficient ρ.

2. The method of claim 1, where the property of the semiconductor material is the emissivity ε.

3. The method of claim 2, further comprising:

e) measuring the radiation intensity thermally emitted from the first surface for radiation having photon energy less than the bandgap energy; and f) calculating the temperature of the semiconductor material using the thermally emitted radiation intensity and the calculated emissivity.

4. The method of claim 1, wherein the EM radiation with photon energy above the bandgap energy of the semiconductor is a pulse of EM radiation.

5. An apparatus for measuring measuring a property of a semiconductor material in a semiconductor material thermal processing system, comprising;

a) a source of electromagnetic (EM) radiation having photon energy less than the bandgap energy of the semiconductor material for directing the (EM) radiation having photon energy less than the bandgap energy of the semiconductor material on to a first surface of the semiconductor material;

b) a source of EM radiation having photon energy greater than the bandgap energy of the semiconductor material for directing the EM radiation having photon energy greater than the bandgap energy of the semiconductor material on to a second surface of the semiconductor material, the EM radiation having photon energy greater than the bandgap energy of the semiconductor material having sufficient intensity to produce enough electrons in the semiconductor material to substantially reduce the transmission in the semiconductor material of the EM radiation having photon energy less than the bandgap energy; and c) measurement means for measuring the reflection coefficient $\rho$ of the first surface for the radiation having photon energy less than the bandgap energy of the semiconductor material.

6. The apparatus of claim 5, further comprising;

d) means for measuring the radiation intensity thermally emitted from the first surface for radiation having photon energy less than the bandgap energy.

* * * * *